(12) United States Patent
Maeng et al.

(10) Patent No.: US 6,618,642 B2
(45) Date of Patent: Sep. 9, 2003

(54) METHOD, PROGRAM STORAGE DEVICE, AND APPARATUS FOR OPTIMIZING AND ANALYZING EFFICIENCY OF EQUIPMENT

(75) Inventors: Ju-Seok Maeng, Suwon (KR); In-ho Hyun, Suwon (KR); Sung-tae Kim, Sungnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/734,857

(22) Filed: Dec. 13, 2000

(65) Prior Publication Data
US 2001/0005799 A1 Jun. 28, 2001

(30) Foreign Application Priority Data
Dec. 18, 1999 (KR) ............................. 99-58927

(51) Int. Cl.[7] ............................................... G06F 19/00
(52) U.S. Cl. ....................................... 700/173; 700/159
(58) Field of Search ........................ 700/1, 28, 90–173; 483/4–6; 703/1, 28

(56) References Cited
U.S. PATENT DOCUMENTS

| | | | |
|---|---|---|---|
| 4,796,194 A | * 1/1989 | Atherton | 700/103 |
| 5,053,970 A | * 10/1991 | Kurihara et al. | 700/104 |
| 5,093,794 A | * 3/1992 | Howie et al. | 700/100 |
| 5,128,860 A | * 7/1992 | Chapman | 700/99 |
| 5,768,119 A | * 6/1998 | Havekost et al. | 700/4 |

* cited by examiner

Primary Examiner—Leo Picard
Assistant Examiner—Walter R. Swindell
(74) Attorney, Agent, or Firm—Volentine Francos, PLLC

(57) ABSTRACT

A method, apparatus and program storage device for analyzing and optimizing equipment efficiency are disclosed. In an illustrative embodiment equipment running time is subdivided into a valuable operating time component and a plurality of performance loss time components. Ideal equipment reference information reflecting dynamic manufacturing parameters is simulated, and an operational performance loss is analyzed in detail. From the analysis of the operational performance loss, priority in input of resources is determined. Advantageously, parameters of a dynamically changing manufacturing environment are incorporated in the analysis and optimization of general equipment efficiency. Moreover, performance loss is more accurately analyzed compared to conventional methods. As such, the performance operating rate is more effectively utilized in reducing performance loss.

23 Claims, 8 Drawing Sheets

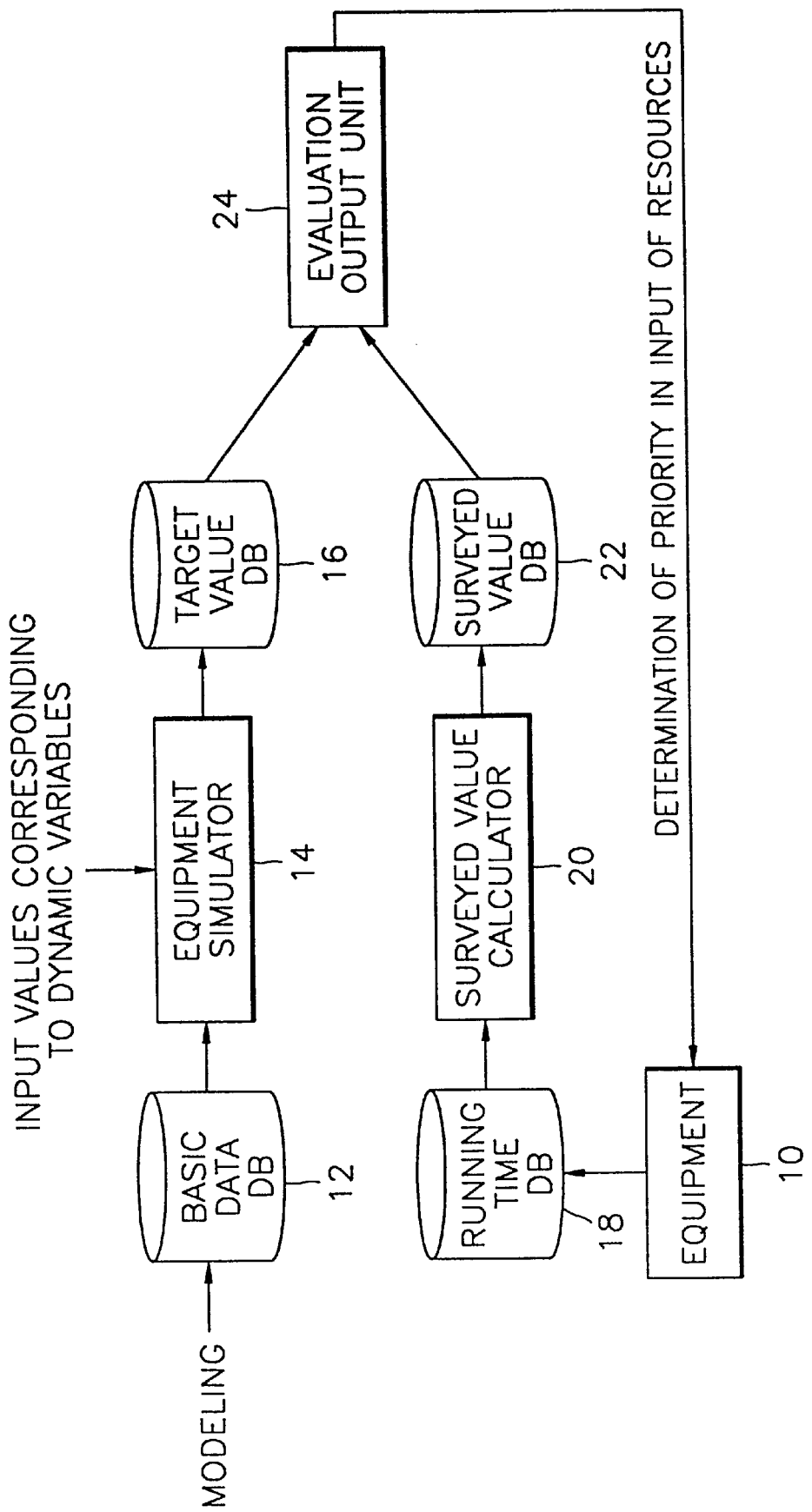

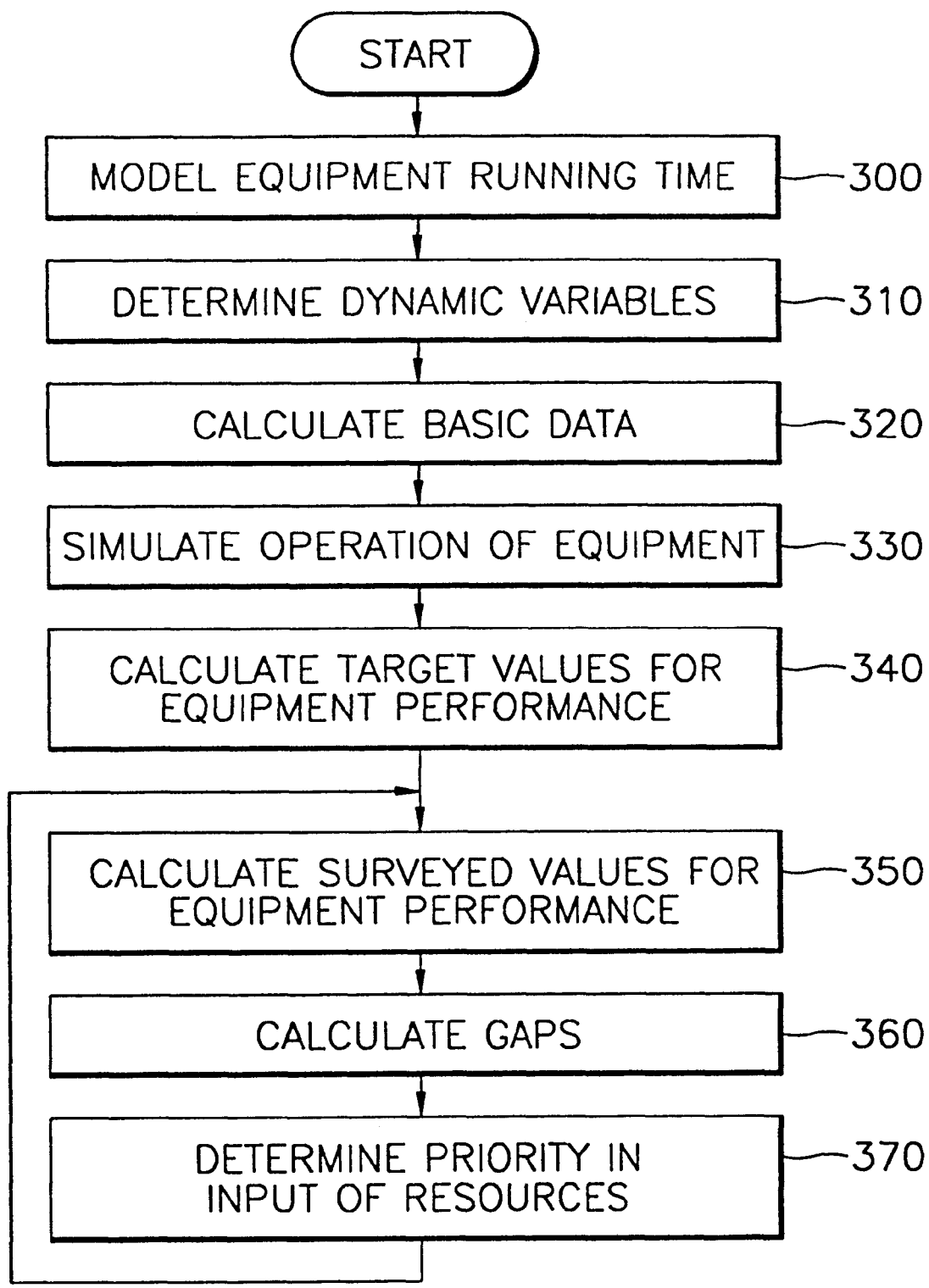

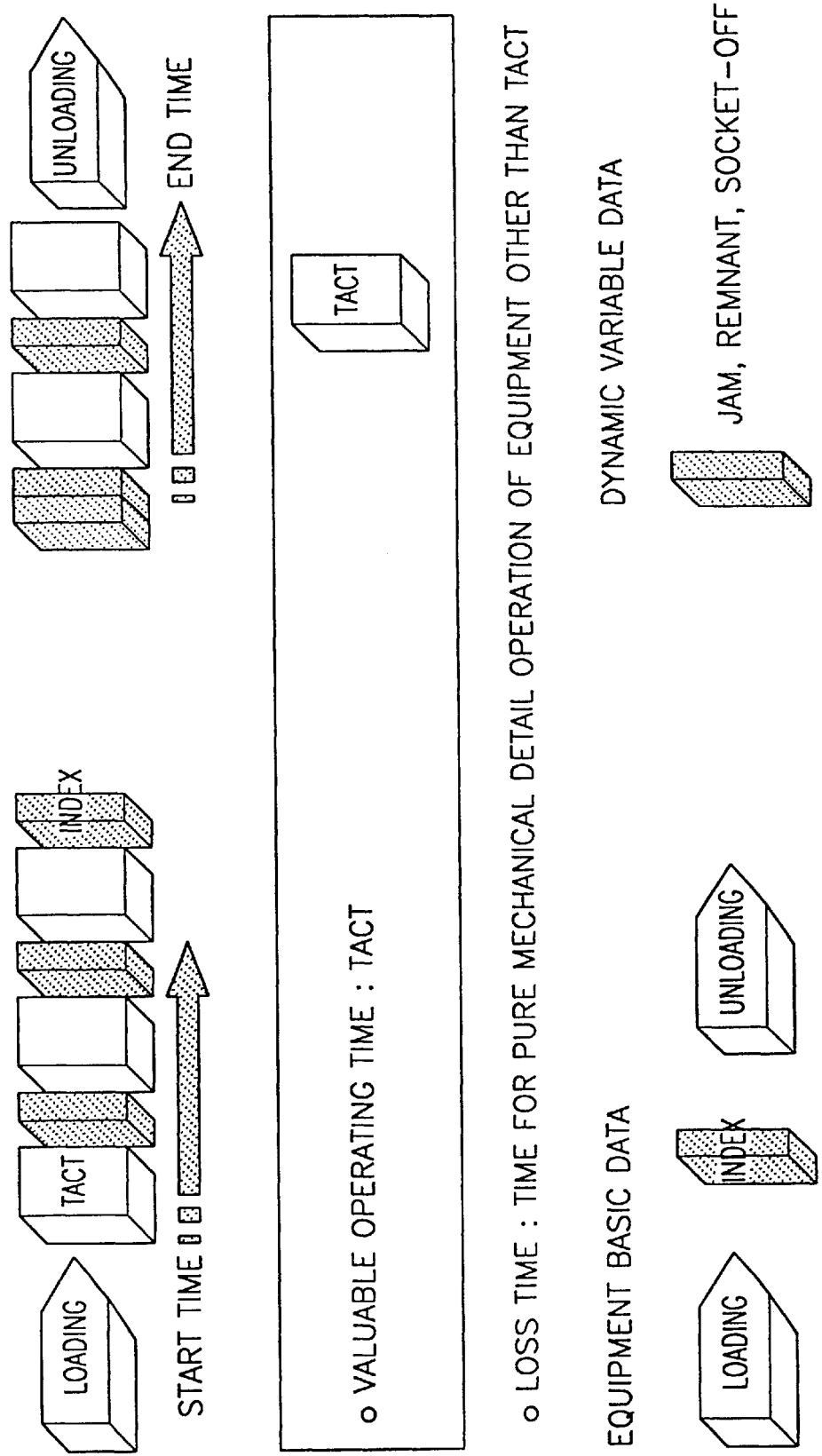

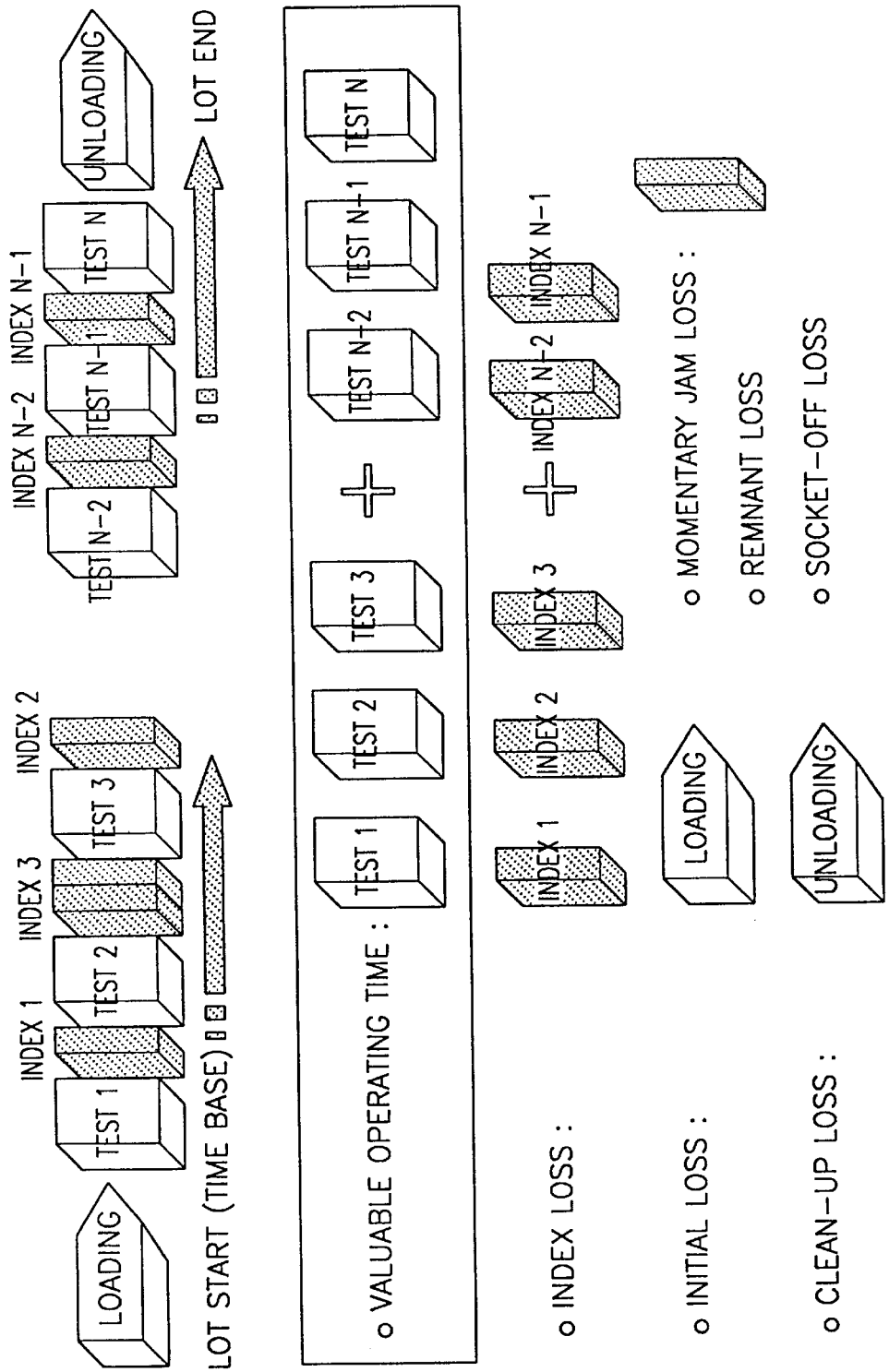

TEST HANDLER EQUIPMENT LOSS REPORT

FIG. 6

ABLE SYSTEM – [EQUIPMENT LOSS SUMMARY]

FILE (F)  LOSS REPORT (L)  LOSS SIMULATOR (S)  TPT CHART (T)  WINDOW (W)  HELP (H)

CONDITIONS
PERIOD: DAILY ▶
WORKING GROUP: DAY ▶
DISPLAY: EQUIPMENT ▶

TERM
1999-12-08 – 1999-12-08
MANUFACTURING TEAM ▶
DRAM TEST ▶

OPTION
EQUIPMENT GROUP: ESSENTIAL EQUIPMENT ▶
DRAM TEST GROUP ▶   DRAM TEST ▶   TEST ROOM ▶
A ▶                  M6862 ▶       ▶

[INQUIRE]  [EXCEL]
[CLOSE]

| EQUIPMENT ID | TARGETS HANDLER | TARGETS PRIME | RESULTS PRIME | RESULTS RETEST | RESULTS TIME OPERATING RATE | LOSS LOAD | LOSS UNLOAD | RESULTS REMNANT | S/D | INDEX | JAM_A | B | C |
|---|---|---|---|---|---|---|---|---|---|---|---|---|---|
| AD-11 | 89.1 | 89.1 | 73.5 | 67.9 | 11.7 | 5.2 | 0.8 | 1.1 | 2.4 | 1.4 | 15.6 | 0.0 | 0.0 |
| AD-12 | 88.1 | 88.1 | 56.2 | 53.1 | 7.1 | 2.1 | 2.3 | 0.6 | 1.8 | 0.4 | 29.3 | 1.9 | 5.4 |
| AD-48 | 82.5 | 82.5 | 80.4 | 72.8 | 9.2 | 7.4 | 2.8 | 1.4 | 1.3 | 5.5 | 1.2 | 0.0 | 0.0 |
| AVERAGE | 86.5 | 86.5 | 70.0 | 64.6 | 9.3 | 4.9 | 2.0 | 1.0 | 1.8 | 2.4 | 15.4 | 0.6 | 1.8 |
| GAP | | | −16.5 | | | 1.5 | 0.3 | −1.1 | 1.8 | −3.8 | 17.8 | | |

METHOD, PROGRAM STORAGE DEVICE, AND APPARATUS FOR OPTIMIZING AND ANALYZING EFFICIENCY OF EQUIPMENT

CROSS REFERENCE TO RELATED APPLICATIONS

The present invention is related to and claims priority from Korean Patent Application Number 99-58927, filed Dec. 18, 1999, and assigned to the assignee of the present invention.

1. Field of the Invention

The present invention relates generally to a method for optimizing the efficiency of equipment and, particularly to a method and apparatus for analyzing and optimizing the efficiency of equipment used in semiconductor manufacturing. The invention further relates to a program storage device which is readable by a machine and which tangibly embodies a program for analyzing and optimizing the efficiency of equipment.

2. Background of the Invention

In manufacturing environments such as semiconductor manufacturing, it is useful to continually improve the efficiency of the manufacturing process. Such improvements in efficiency may have desired benefits including improved yield and reduced cost of manufacture, which are advantageous in the competitive semiconductor industry. One way to improve the manufacturing efficiency is by improving manufacturing equipment efficiency. The degree of efficiency of the equipment is often referred to as general equipment efficiency.

Quantitatively, the general equipment efficiency is obtained by multiplying a time operating rate by a performance operating rate. The time operating rate is defined as a ratio of the equipment running time to turn around time. The equipment running time corresponds to a time obtained by subtracting an equipment jam time from the turn around time. The equipment jam time includes a time for which the equipment stops due to breakdown, run-down, product management (PM), engineer-down, planned stop and preparation for work. Turn around time is defined as the total manufacturing time. The performance operating rate is defined as the ratio of a valuable operating time to equipment running time. A performance loss time corresponds to a time obtained by subtracting the valuable operating time from the equipment running time. The performance loss time includes momentary jam time and speed loss time.

One conventional method for managing equipment efficiency is a method based on the time operating rate. Unfortunately, this method is has limitations, especially in reducing loss. To this end, the referenced conventional method calculates the performance operating rate based on a parameter known as unit per equipment hour (UPEH). The UPEH does not incorporate dynamic manufacturing variables (for example lot size, manufacturing time and performance of equipment) so that a dynamically changing manufacturing environment cannot be accurately reflected in an effort to optimize equipment efficiency. Rather, this conventional technique bases the calculation of performance operating loss on an average of static manufacturing data. As such, analysis of detailed factors such as the type and size of a particular performance loss is difficult to achieve. Accordingly, corrective action for eliminating a corresponding loss may be difficult to perform.

As can be appreciated, the conventional techniques to improve equipment efficiency have clear limitations. What is needed therefore, is a technique which overcomes the problems and shortcomings of conventional techniques.

SUMMARY OF THE INVENTION

The present invention provides a method for analyzing and optimizing equipment efficiency which substantially overcomes one or more of the problems noted above. In an illustrative embodiment an equipment running time is subdivided into a valuable operating time component and a plurality of performance loss time components. Ideal equipment reference information reflecting dynamic manufacturing parameters is simulated, and an operational performance loss is analyzed in detail. From the analysis of the operational performance loss, priority in input of resources is determined.

Advantageously, the present invention incorporates parameters of a dynamically changing manufacturing environment in the analysis and optimization of general equipment efficiency. Moreover, performance loss is more accurately analyzed compared to conventional methods. As such, the performance operating rate is more effectively utilized in reducing performance loss.

According to another embodiment, the present invention provides a method for analyzing and optimizing an equipment efficiency. The method includes the steps of (a) subdividing an equipment running time of a provided equipment into a valuable operating item and a plurality of performance loss items and modeling the equipment running time; (b) calculating performance loss times, among the modeled performance loss items to provide basic data, the performance loss times corresponding to items independent of dynamic variables, the dynamic variables having values that change according to the operational environment of the equipment; (c) simulating the operation of the equipment using values corresponding to the dynamic variables and the basic data and calculating target values for the performance of the equipment; (d) measuring an actual equipment running time of the equipment and calculating surveyed values for the performance of the equipment, the surveyed values corresponding to the target values; and (e) comparing the surveyed values with the corresponding target values to obtain gaps, and determining priority in input of resources.

In another aspect of the present invention, a program storage device is provided which is readable by a machine and which tangibly embodies a program of instructions executable by the machine to perform the processes described herein for analyzing and optimizing an equipment efficiency.

The present invention still further provides an apparatus for analyzing equipment efficiency, including a basic data database for storing performance loss times as basic data, the performance loss times corresponding to items independent of dynamic variables, whose values change according to the operational environment of the equipment, among a plurality of performance loss items modeled with respect to a provided equipment; an equipment simulator for receiving values corresponding to the dynamic variables input by a user and the basic data from the basic data database, simulating the operation of the equipment, and calculating target values for the performance of the equipment; a surveyed value calculator for calculating surveyed values for the performance of the equipment from the measured actual equipment running time data of the equipment, the surveyed values corresponding to the target values for the performance of the equipment; and an evaluation output unit for calculating and outputting the gaps between the target values input from the equipment simulator and the corresponding surveyed values input from the surveyed value calculator.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more apparent by describing in detail illustrative embodiments thereof with reference to the attached drawings in which:

FIG. 2 is a block diagram of an apparatus for analyzing equipment efficiency according to an exemplary embodiment of the present invention;

FIG. 3 is a flowchart showing a procedure of optimizing equipment efficiency according to an exemplary embodiment of the present invention;

FIGS. 4A through 4C are diagrams for explaining modeling of the operation of semiconductor manufacturing equipment according to an exemplary embodiment of the present invention;

FIG. 6 is an example of a display screen of a report provided by an evaluation output unit according to an exemplary embodiment of the present invention.

DETAILED DESCRIPTION OF THE PREFERRED EMBODIMENTS

Defined Terms

The following terms and equations relate to the disclosure of the present invention.

General equipment efficiency(%) =  (1)

$$\text{Time operating rate} \times \text{Performance operating rate}$$

Time operating rate (%) =

$$\frac{\text{Turn around time} - \text{Equipment jam time}}{\text{Turn around time}} \times 100$$

Performance operating rate (%) = $\frac{\text{Customer valuable time}}{\text{Equipment running time}} \times 100$ Customer valuable time =

$$\text{Theoretical period of time} \times \text{Yield} = \frac{\text{Yield}}{UPEH} \times 60.$$

Figure 1:
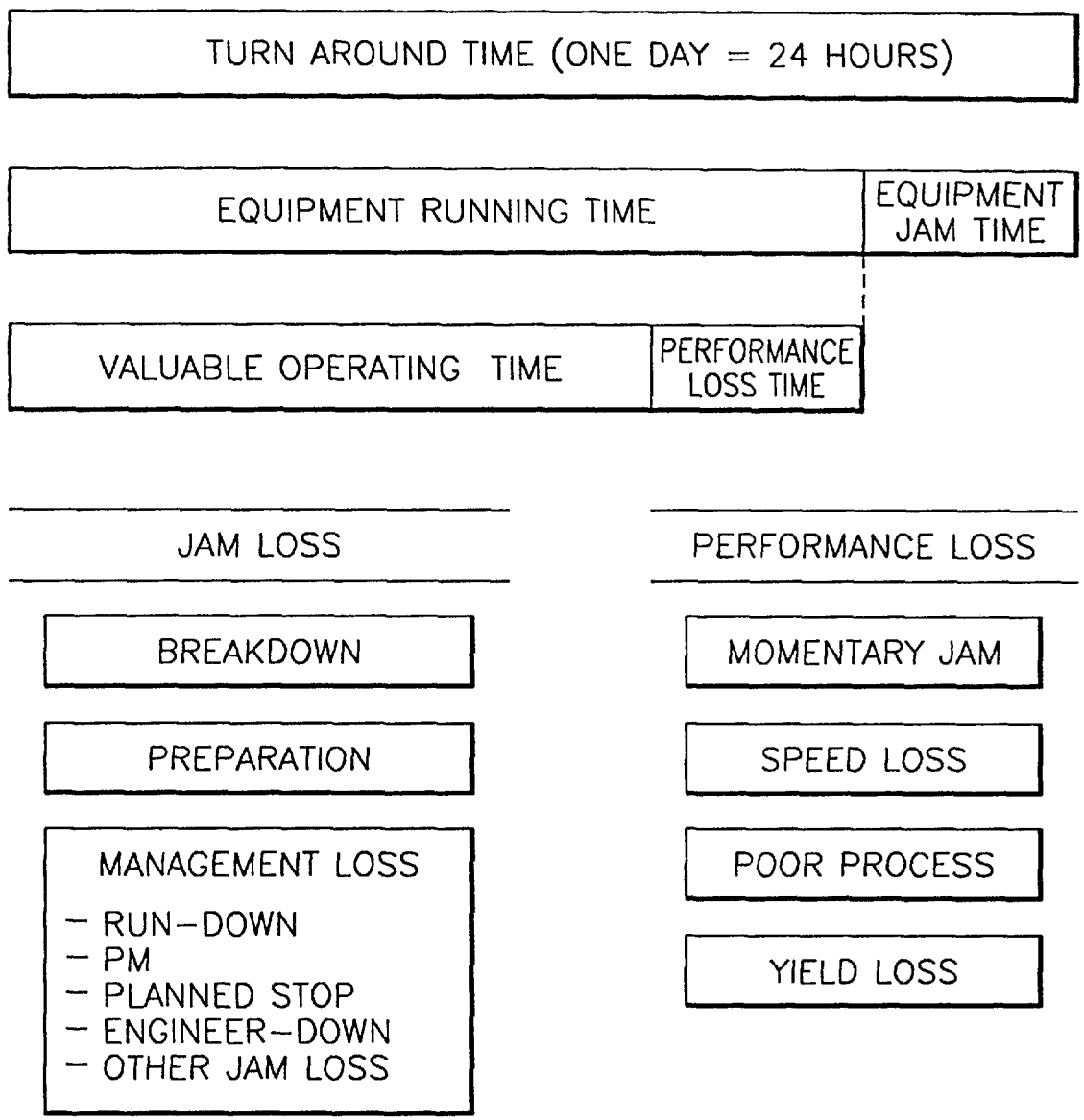
FIG. 1 is a conceptual diagram showing the breakdown of factors involved in loss in equipment according to an exemplary embodiment of the present invention.

Referring to FIG. 1, a conceptual diagram showing the factors involved in the analysis of equipment according to an exemplary embodiment of the present invention is shown. As can be appreciated from a review of FIG. 1, the present invention subdivides an equipment running time into a valuable operating time and a plurality of performance loss times for modeling. The performance loss time may result from, among other factors not shown in FIG. 1, momentary jam, speed loss, poor processes and yield loss. Generally, the invention of the present disclosure simulates ideal equipment reference information reflecting dynamic manufacturing parameters, and analyzes an operational performance loss in detail so as to determine priority in input of resources.

Illustrative Embodiments of the Invention

Referring to FIG. 2, an apparatus for analyzing an equipment efficiency according to an embodiment of the present invention includes a basic data database (DB) 12, an equipment simulator 14, a surveyed value calculator 20 and an evaluation output unit 24.

The basic data DB 12 stores basic data related to equipment 10. The basic data includes performance loss times calculated for items independent of dynamic variables among a plurality of modeled performance loss items. The dynamic variables may vary according to an operational environment of the equipment 10 and may include a lot size, a socket-off time and a test time, among other factors within the purview of one having ordinary skill in the art.

The equipment simulator 14 receives values corresponding to the dynamic variables input by a user and the basic data from the basic data DB 12. The equipment simulator simulates the operation of the equipment 10 using the dynamic variables and the basic data and calculates target values for the performance of the equipment 10. The target values include a performance operating rate, a UPEH and the ratios of performance loss times (which correspond to the modeled performance loss items) to an equipment running time. The apparatus for analyzing equipment efficiency according to the present embodiment illustratively includes a target value DB 16 for storing the target values for equipment performance calculated by the equipment simulator 14.

The surveyed value calculator 20 calculates surveyed values for the performance of the equipment 10 in real time at time stamps based on actual equipment running time data measured with respect to the equipment 10. In other words, the surveyed value calculator 20 may include an algorithm for calculating actual performance loss times corresponding to the modeled performance loss items. The surveyed values for the performance may include the actual performance operating rate of the equipment 10 and the ratios of actual performance loss times to an actual equipment running time, based on the actual performance loss times. The apparatus for analyzing an equipment efficiency according to an exemplary embodiment of the present invention illustratively includes a running time DB 18 for storing actual equipment running time data extracted from the equipment 10 and a surveyed value DB 22 for storing the surveyed values for the equipment performance. In this case, the surveyed value calculator 20 receives the actual equipment running time data from the running time DB 18 and outputs the calculated surveyed values to the surveyed value DB 22.

The evaluation output unit 24 calculates the gap between the target value from the target value DB 16 and the surveyed value from the surveyed value DB 22 and outputs the result.

Referring now to FIG. 3, an illustrative process according to the present invention is shown. The process is started with the equipment running time of provided manufacturing equipment being divided into a valuable operating time and a performance loss time. The performance loss times are subdivided into a at least two detailed performance loss components, such as the exemplary components shown in FIG. 1. Mathematical modeling results in digitization/ quantization of the components, thereby modeling the equipment running time shown as step 300. Next, the operational environment of the equipment is defined by dynamic variables in step 310. Among the modeled performance loss components, performance loss times corresponding to the items independent of the dynamic variables are digitized and stored as basic data in a basic data database (DB) in step 320. The operation of the manufacturing equipment is simulated in step 330 using the values of dynamic variables input by a user, and the basic data input from the basic data database. The performance loss times and ideal target values for the performance of the equipment are calculated in step 340 according to equations determined during the modeling.

The target values for the performance of the equipment include a performance operating rate and ratios of performance loss times (corresponding to the modeled performance loss items) to the equipment running time. An actual equipment running time of the provided equipment is measured in real time at a time stamp. An actual valuable operating time and subdivided actual performance loss times are calculated using equations determined during the modeling, and surveyed values for the performance of the equipment are calculated in step 350. The surveyed values for the performance of the equipment include an actual performance operating rate and the ratios of the actual performance loss times (which correspond to the modeled performance loss items) to the actual equipment running time. Thereafter, the gaps between the target values calculated in step 340 and the corresponding surveyed values calculated in the step 350 are calculated and output in step 360. By analyzing gaps for the subdivided performance loss items, priority in input of resources, such as improvement of working method (for example, determination of economical lot size; the human power, for example, man hours, corresponding to loss weighted value; maintenance; investment; and improvement for each equipment performance item is determined in step 370 so as to appropriately improve the factors reducing the performance.

FIG. 4A is a diagram according to an exemplary embodiment of the present invention for explaining the modeling of the operation of a typical semiconductor manufacturing device. An actual processing time TACT (time actual) for which the substantial operation of the equipment is performed during the equipment running time is referred to as a valuable operating time, and, other than the actual processing time TACT, a time for which the detailed operations of the equipment itself are performed is referred to as a loss time, i.e., a performance loss time. Among the subdivided performance loss times, a loading time, an index time and an unloading time are modeled as basic equipment data, and a momentary jam time, a remnant time and a socket off time are modeled as dynamic variable equipment data.

Figure 4B:
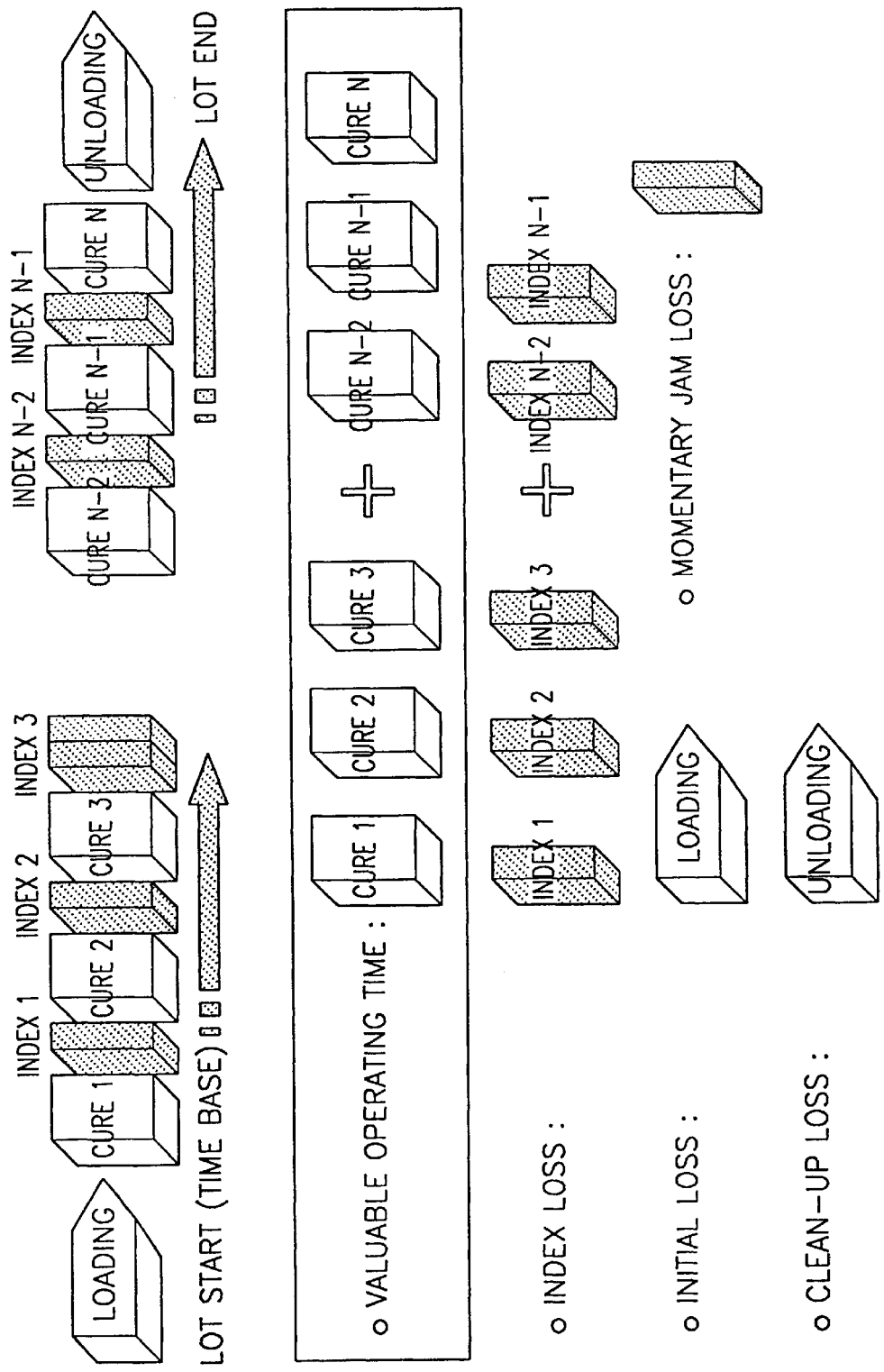

FIG. 4B is a diagram according to an exemplary embodiment of the present invention for explaining the modeling of the operation of auto mold equipment, which is a type of semiconductor manufacturing equipment. Referring to FIG. 4B, a valuable operating time is modeled assuming that it is given by the sum of the cure time of each shot. The cure time is the sum of a pre-sitting time, a transfer time and a mold cure time during a molding process. A performance loss item is subdivided into an index loss, an initial loss, a clean-up loss and a momentary jam loss time for modeling.

FIG. 4C is a diagram according to an exemplary embodiment of the present invention for explaining the modeling of the operation of a semiconductor package test handler, which is another type of semiconductor manufacturing equipment. The equipment running time of the package test handler is subdivided into a test time, an initial loss, a clean-up loss, a remnant loss, a socket-off loss, an index loss and a momentary jam loss time.

The test time is a time for which an actual test is performed by the package test handler. The sum of all test times is a valuable operating time.

The initial loss time is for loading a new lot on the package test handler for a test. An equation for calculating the initial loss time is expressed as $$\text{Loading time} = \text{First tray start time} - \text{Lot start time} \quad (2)$$

where the first tray start time and the lot start time can be directly obtained from actual equipment running time data.

The clean-up loss time is for unloading a lot from the package test handler after completing a test. An equation for calculating the clean-up loss time is expressed as $$\text{Unloading time} = \text{Lot end time} - \text{Last tray end time} \quad (3)$$

where the lot end time and the last tray end time can be directly obtained from the actual equipment running time data.

All the test objects (input) are grouped in units of trays of a predetermined size (for example, sixty-four) and the test tray units of the test objects are processed in parallel. In this case, it may happen that the last test tray contains less test objects (input) than the tray size, i.e., sixty-four, and thus the remnant loss time occurs. An equation for calculating the remnant loss time is expressed as $$\text{Remnant loss} = \left(1 - \frac{\text{Input}}{((64 - S/O \text{ count}) \times \text{Tray count})}\right) \times (\text{Sum of test times by tray}) \quad (4)$$

where sixty-four is an example of the maximum number of test objects able to be tested in each test tray, the S/O count is a dynamic variable corresponding to the number of sockets at which a test cannot be performed in each test tray, and the tray count is the number of test trays, which is determined in accordance with the value of a dynamic variable lot size.

The socket-off loss (S/O loss) is caused by sockets at which a test cannot be performed in a test tray. An equation for calculating the socket-off loss time is expressed as $$S/O \text{ loss} = \left(1 - \frac{64 - S/O \text{ count}}{64}\right) \times (\text{Sum of test times by tray}) \quad (5)$$

where sixty-four is an example of the maximum number of test objects which can be tested in each test tray.

The index loss is the sum of the intervals, none of which exceed twenty seconds, between test times for trays. An equation for calculating the index loss is expressed as $$\text{Index loss} = \text{Tray end time} - \text{Next tray start time} \quad (6)$$

(if(Index time≦20))

The jam loss is the sum of intervals, each of which exceeds twenty seconds, between test times for trays. An equation for calculating the jam loss is expressed as $$\text{Jam time} = \text{Tray end time} - \text{Next tray start time} \quad (7)$$

(if(Jam time>20))

In Equations (6) and (7), the tray end time and the next tray start time can be directly obtained from the actual equipment running time data.

An equation for calculating the target value is expressed as $$\text{Total processing time} = \text{Loading time} + \text{Sum of test times} + \quad (8)$$
$$\text{Sum of index times} + \text{Jam times} + \text{Unloading times}$$

$$\text{Performance operating rate} (\%) = \frac{\text{Sum of test times}}{\text{Total processing time}} \times 100$$

$$UPEH = \frac{\text{Lot size} \times 3600}{\text{Total processing time}}$$

$$\text{Loss item} = \text{Initial loss} + \text{Sum of index losses} +$$
$$\text{Remnant loss} + \text{Socket-off loss} + \text{Jam loss} + \text{Clean-up loss}$$

In the above modeling of the package test handler, the test time is classified into a customer valuable item, and the initial loss, the clean-up loss, the remnant loss, the socket-off loss, the index loss and the jam loss are classified into a performance loss item.

The test time, lot size and S/O count which vary according to an operational environment of the equipment are defined as dynamic variables in step 310. Among the modeled performance loss items, performance loss times corresponding to the items independent of the dynamic variables are previously digitized and stored in the basic data DB 12 of FIG. 2 as basic data in step 320 of FIG. 3. The performance loss item previously defined as the basic data includes the initial loss, clean-up loss and index loss.

The operation of the equipment is simulated in step 330 of FIG. 3 using the values of dynamic variables input by a user and the basic data input from the basic data DB 12. The performance loss times and ideal target values for the performance of the equipment are calculated in step 340 of FIG. 2 according to equations determined during the modeling. The target values for the performance of the equipment include a performance operating rate and ratios of performance loss times, corresponding to the modeled performance loss items, to the equipment running time.

Figure 5:
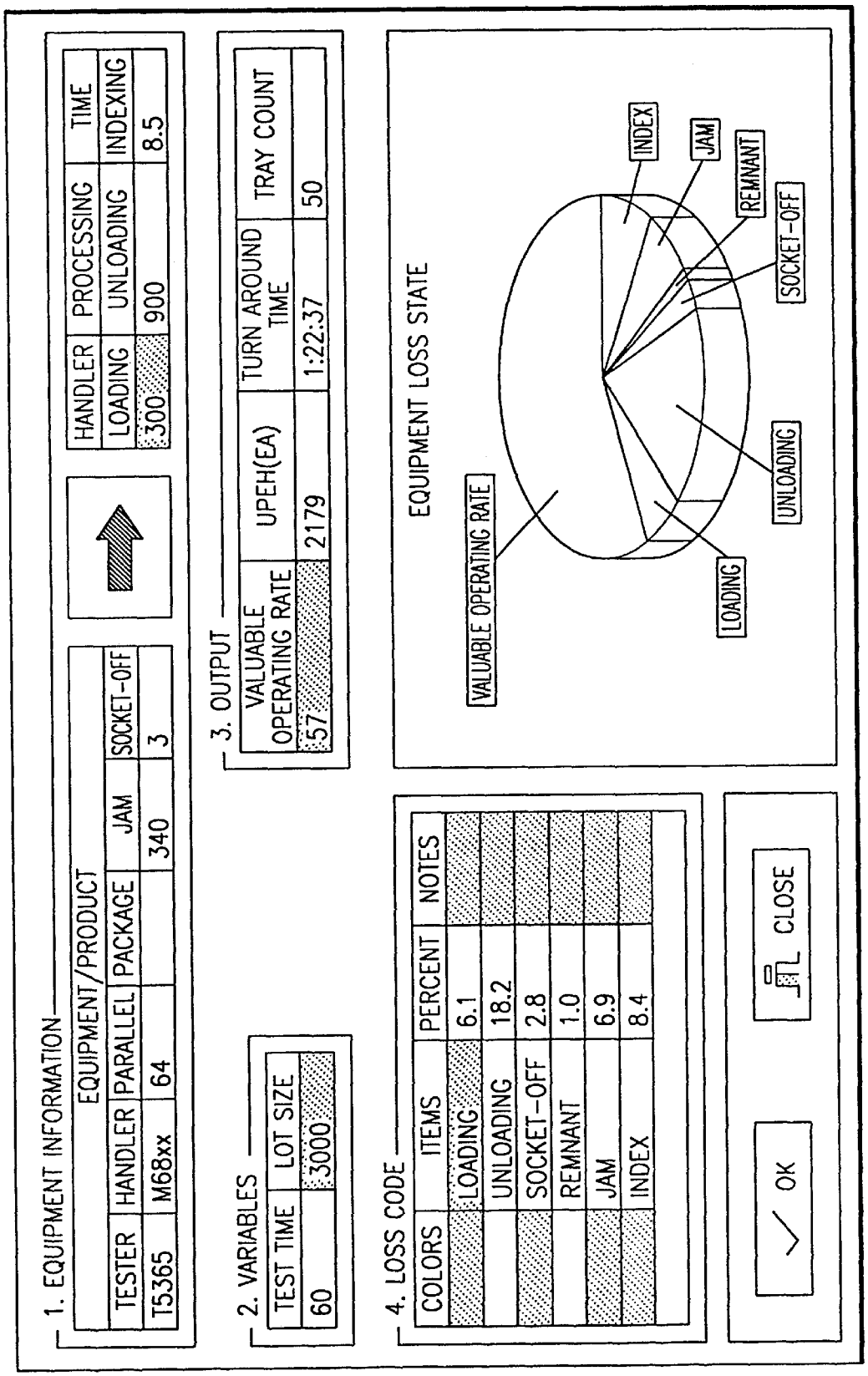
FIG. 5 shows an example of a display screen of a simulation provided by an equipment simulator according to an exemplary embodiment of the present invention.

FIG. 5 is an example of a simulation display screen provided by the equipment simulator 14 of FIG. 2, which is an element of the present embodiment of an apparatus for analyzing an equipment efficiency. Referring to FIG. 5, the basic data, i.e., the loading time, unloading time and indexing time, is displayed on the upper right side. On the upper left side, the jam and socket-off in the section of equipment information, and the test time and lot size in the section of variables are all dynamic variables and their values are input by a user. The valuable operating rate (%) in the output section is another expression of a performance operating rate (%) according to the present invention. The section of loss code shows the ratios of performance loss times, which correspond to the modeled performance loss items, to the equipment running time.

An actual equipment running time of the provided equipment is measured in real time at a time stamp, an actual valuable operating time and subdivided actual performance loss times are calculated using the equations determined during the modeling, and surveyed values for the performance of the equipment is calculated in step 350 of FIG. 3. The surveyed values for the performance of the equipment include an actual performance operating rate and the ratios of the actual performance loss times, which correspond to the modeled performance loss items, to the actual equipment running time.

Thereafter, the gaps between the target values calculated in the step 340 and the corresponding surveyed values calculated in the step 350 are calculated and output in step 360 of FIG. 3.

FIG. 6 is an example of a report display screen provided by the evaluation output unit 24, which is an element of the present embodiment of an apparatus for analyzing an equipment efficiency. Referring to FIG. 6, the overall performance of the equipment can be understood based on the gaps between the target values and surveyed values (results) of the valuable operating rate. In addition, by analyzing gaps for the subdivided performance loss items, priority in input of resources, such as improvement of working method (determination of economical lot size), the human power, for example, man hours, corresponding to loss weighed value, maintenance, investment and improvement for each equipment performance item, is determined in step 370 so as to appropriately improve the factors reducing the performance.

Thereafter, the current performance of the equipment can be confirmed by repeating the steps 350 through 370 of FIG. 3 with the same dynamic variable. The target values for the performance of the equipment can be appropriately modified by inputting dynamic variables suitable for the operational environment of the equipment in the step 330 of FIG. 3.

According to the present invention, equipment performance loss items are modeled by digitizing and quantizing the equipment performance loss items, surveyed values are compared with ideal operation target values calculated by making a simulation based on dynamically changing manufacturing data, and the causes of the gaps between the surveyed values and the target values are analyzed, thereby allowing improvement of factors causing operation loss and providing practical equipment efficiency information. Consequently, productivity can be improved by achieving improvement of the performance efficiency of an equipment according to the present invention.

While this invention has been particularly shown and described with reference to illustrative embodiments thereof, it will be understood by those skilled in the art that various changes in form and details may be made therein without departing from the spirit and scope of the invention. The embodiments have been provided in order to more completely explain the present invention, and the present invention is not restricted to these embodiments.

Morever, it is within the scope of the invention to provide a program storage device which is readable by a machine and which tangibly embodies a program of instructions executable by the machine to perform the processes described herein for analyzing and optimizing an equipment efficiency. For example, the invention can be embodied as computer readable code on a computer readable medium, where the computer readable medium is any data storage device that can store data which can thereafter be read by a computer system. Examples of computer readable media include read-only memories, random-access memories, CD-ROMs, magnetic tapes, floppy disks, optical data storage devices, and so on. Likewise, the computer readable medium can be distributed among plural data storage devices and/or over a computer network so that the computer readable code is stored and executed in a distributed fashion.

What is claimed is:

1. A method for analyzing and optimizing an equipment efficiency, the method comprising:

(a) subdividing an equipment running time of a provided equipment into a valuable operating item and at least two performance loss items and modeling the equipment running time;

(b) calculating performance loss times, among the modeled performance loss items to provide basic data, the performance loss times corresponding to items independent of dynamic variables, the dynamic variables having values that change according to the operational environment of the equipment;

(c) simulating operation of the equipment using the values corresponding to the dynamic variables and the basic data and calculating target values for the performance of the equipment;

(d) measuring an actual equipment running time of the equipment and calculating surveyed values for the performance of the equipment, the surveyed values corresponding to the target values; and (e) comparing the surveyed values with the corresponding target values to obtain gaps, and determining priority in input of resources.

2. The method of claim 1, wherein the target value for the performance of the equipment is a performance operating rate.

3. The method of claim 2, wherein the target values for the performance of the equipment include ratios of performance loss times to the equipment running time, the performance loss times corresponding to the modeled performance loss items.

4. An apparatus for analyzing an equipment efficiency, comprising:

a basic data database which stores performance loss times as basic data, the performance loss times corresponding to items independent of dynamic variables, the dynamic variables having values that change according to the operational environment of a provided equipment among a plurality of performance loss items modeled with respect to the provided equipment;

an equipment simulator which receives values corresponding to the dynamic variables input by a user and the basic data from the basic data database, the equipment simulator capable of simulating the operation of the equipment, and calculating target values for the performance of the equipment;

a surveyed value calculator which calculates surveyed values for the performance of the equipment from the measured actual equipment running time data of the equipment, the surveyed values corresponding to the target values for the performance of the equipment; and an evaluation output unit which calculates and outputting the gaps between the target values input from the equipment simulator and the corresponding surveyed values input from the surveyed value calculator.

5. The apparatus of claim 4, wherein the target value calculated by the equipment simulator is a performance operating rate.

6. The apparatus of claim 4, wherein the target values calculated by the equipment simulator include ratios of performance loss times to the equipment running time, the performance loss times corresponding to the modeled performance loss items.

7. A method for analyzing and optimizing equipment efficiency, the method comprising:

subdividing equipment running time into a valuable operating component and at least two performance loss components;

simulating ideal equipment reference information reflecting dynamic manufacturing parameters;

analyzing an operational performance loss; and determining a priority of input of resources therefrom.

8. The method as recited in claim 7, further comprising calculating performance loss times corresponding to items independent of dynamic variables among modeled performance loss items to provide basic data, the dynamic variables having values that change according to an operating environment of the equipment.

9. The method as recited in claim 8, further comprising simulating operation of the equipment using values corresponding to the dynamic variables and the basic data and calculating target values for performance of the equipment.

10. The method as recited in claim 9, further comprising measuring an actual equipment running time of the equipment and calculating surveyed values for the performance of the equipment, the surveyed values corresponding to the target values.

11. The method as recited in claim 10, further comprising comparing the surveyed values with the corresponding target values to obtain gaps, and determining priority in input of resources.

12. The method as recited in claim 10, wherein the target value for the performance of the equipment is a performance operating rate.

13. The method as recited in claim 10, wherein the target values for the performance of the equipment include ratios of performance loss times to the equipment running time, the performance loss times corresponding to the modeled performance loss items.

14. A program storage device readable by a machine, said program storage device tangibly embodying a program of instructions executable by the machine to perform a process for analyzing and optimizing an equipment efficiency, wherein the process includes:

(a) subdividing an equipment running time of a provided equipment into a valuable operating item and at least two performance loss items and modeling the equipment running time;

(b) calculating performance loss times, among the modeled performance loss items to provide basic data, the performance loss times corresponding to items independent of dynamic variables, the dynamic variables having values that change according to the operational environment of the equipment;

(c) simulating operation of the equipment using the values corresponding to the dynamic variables and the basic data and calculating target values for the performance of the equipment;

(d) measuring an actual equipment running time of the equipment and calculating surveyed values for the performance of the equipment, the surveyed values corresponding to the target values; and (e) comparing the surveyed values with the corresponding target values to obtain gaps, and determining priority in input of resources.

15. The program storage device of claim 14, wherein the target value for the performance of the equipment is a performance operating rate.

16. The program storage device of claim 14, wherein the target values for the performance of the equipment include ratios of performance loss times to the equipment running time, the performance loss times corresponding to the modeled performance loss items.

17. A program storage device readable by a machine, said program storage device tangibly embodying a program of instructions executable by the machine to perform a process for analyzing and optimizing an equipment efficiency, wherein the process includes:

subdividing equipment running time into a valuable operating component and at least two performance loss components;

simulating ideal equipment reference information reflecting dynamic manufacturing parameters;

analyzing an operational performance loss; and determining a priority of input of resources therefrom.

18. The program storage device as recited in claim 17, wherein the process further includes calculating performance loss times corresponding to items independent of dynamic variables among modeled performance loss items to provide basic data, the dynamic variables having values that change according to an operating environment of the equipment.

19. The program storage device as recited in claim 18, wherein the process further includes simulating operation of the equipment using values corresponding to the dynamic variables and the basic data and calculating target values for performance of the equipment.

20. The program storage device as recited in claim 19, wherein the process further includes measuring an actual equipment running time of the equipment and calculating surveyed values for the performance of the equipment, the surveyed values corresponding to the target values.

21. The program storage device as recited in claim 20, further comprising comparing the surveyed values with the corresponding target values to obtain gaps, and determining priority in input of resources.

22. The program storage device as recited in claim 20, wherein the target value for the performance of the equipment is a performance operating rate.

23. The program storage device as recited in claim 20, wherein the target values for the performance of the equipment include ratios of performance loss times to the equipment running time, the performance loss times corresponding to the modeled performance loss items.

* * * * *